United States Patent
Poremba et al.

(10) Patent No.: US 9,053,039 B2
(45) Date of Patent: Jun. 9, 2015

(54) INSTALLATION CACHE

(71) Applicant: ADVANCED MICRO DEVICES, INC., Sunnyvale, CA (US)

(72) Inventors: Matthew R. Poremba, Shavertown, PA (US); Gabriel H. Loh, Bellevue, WA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 227 days.

(21) Appl. No.: 13/724,867

(22) Filed: Dec. 21, 2012

(65) Prior Publication Data
US 2014/0181389 A1      Jun. 26, 2014

(51) Int. Cl.
*G06F 12/08* (2006.01)

(52) U.S. Cl.
CPC .......... *G06F 12/0893* (2013.01); *G06F 12/084* (2013.01); *G06F 12/0862* (2013.01); *G06F 12/0811* (2013.01); *Y02B 60/1225* (2013.01)

(58) Field of Classification Search
CPC .............. G06F 12/0811; G06F 12/084; G06F 12/0862; G06F 12/0893
See application file for complete search history.

(56) References Cited

U.S. PATENT DOCUMENTS

| | | | | |
|---|---|---|---|---|
| 5,813,031 A * | 9/1998 | Chou et al. | | 711/122 |
| 5,905,997 A | 5/1999 | Stiles | | |
| 6,212,602 B1 * | 4/2001 | Wicki et al. | | 711/122 |
| 6,427,188 B1 * | 7/2002 | Lyon et al. | | 711/122 |
| 6,928,522 B2 * | 8/2005 | Yang | | 711/144 |
| 8,032,711 B2 * | 10/2011 | Black et al. | | 711/137 |
| 8,059,441 B2 | 11/2011 | Taufique et al. | | |
| 8,117,465 B2 * | 2/2012 | Wu et al. | | 713/300 |
| 2009/0265586 A1 * | 10/2009 | Fitoussi et al. | | 714/48 |
| 2013/0238856 A1 * | 9/2013 | Loh et al. | | 711/118 |

OTHER PUBLICATIONS

Micro 11, Efficiently enabling conventional block sizes for very large die-stacked DRAM Caches by Gabriel H. Loh and Mark D. Hill, Dec. 3-7, 2011, Porto Alegre, Brazil.

* cited by examiner

*Primary Examiner* — Hiep Nguyen

(74) *Attorney, Agent, or Firm* — Park, Vaughan, Fleming & Dowler, LLP

(57) ABSTRACT

Data caching methods and systems are provided. The data cache method loads data into an installation cache and a cache (simultaneously or serially) and returns data from the installation cache when the data has not completely loaded into the cache. The data cache system includes a processor, a memory coupled to the processor, a cache coupled to the processor and the memory and an installation cache coupled to the processor and the memory. The system is configured to load data from the memory into the installation cache and the cache (simultaneously or serially) and return data from the installation cache to the processor when the data has not completely loaded into the cache.

20 Claims, 3 Drawing Sheets

INSTALLATION CACHE

TECHNICAL FIELD

The disclosed embodiments relate to the field of memory caches and more particularly toward row-based memory caches.

BACKGROUND

Die-stacking technology enables multiple layers of Dynamic Random Access Memory (DRAM) to be integrated with single or multicore processors. Die-stacking technologies provide a way to tightly integrate multiple disparate silicon die with high-bandwidth, low-latency interconnects. The implementation could involve vertical stacking as illustrated in FIG. 1A, in which one or more DRAM layers 100 are stacked above a multicore processor 102. Alternately, as illustrated in FIG. 1B, a horizontal stacking of the DRAM 100 and the processor 102 can be achieved on an interposer 104. In either case the processor 102 (or each core thereof) is provided with a high bandwidth, low-latency path to the stacked memory 100.

Computer systems typically include a processing unit and one or more cache memories. A cache memory is a high-speed memory that acts as a buffer between the processor and main memory. Although smaller than the main memory, the cache memory typically has appreciably faster access time than the main memory. Memory subsystem performance can be increased by storing the most commonly used data in smaller but faster cache memories.

When the processor accesses a memory address, the cache memory determines if the data associated with the memory address is stored in the cache memory. If the data is stored in the cache memory, a cache "hit" results and the data is provided to the processor from the cache memory. If the data is not in the cache memory, a cache "miss" results and a lower level in the memory hierarchy must be accessed. Due to the additional access time for lower level memory, data cache misses can account for a significant portion of an application program's execution time.

In order to reduce cache miss rates, various prefetching techniques have been developed. Prefetching involves fetching data from lower levels in the memory hierarchy and into the cache memory before the processor would ordinarily request the data be fetched. By anticipating processor access patterns, prefetching helps to reduce cache miss rates. However, when die-stacked DRAM memory is used as a large last-level cache with row-based access, high access latency may result due to the activation, read and pre-charge command sequences that are typically required. Such high latency causes techniques like pre-fetching to become less effective, since data is not considered to be cached until it physically resides in the cache.

SUMMARY OF THE EMBODIMENTS

A data cache method is provided. The method loads data into an installation cache and another cache (simultaneously or serially) and returns data from the installation cache when the data has not completely loaded into the other cache.

A data cache system includes at least a processor, a memory coupled to the processor, another cache coupled to the processor and the memory and an installation cache coupled to the processor and the memory. The system is configured to load data from the memory into the installation cache and the other cache (simultaneously or serially) and return data from the installation cache to the processor when the data has not completely loaded into the other cache.

BRIEF DESCRIPTION OF THE DRAWINGS

The embodiments will hereinafter be described in conjunction with the following drawing figures, wherein like numerals denote like elements.

DETAILED DESCRIPTION

The following detailed description is merely exemplary in nature and is not intended to limit the disclosure or the application and uses of the disclosure. As used herein, the word "exemplary" means "serving as an example, instance, or illustration." Thus, any embodiment described herein as is not necessarily to be construed as preferred or advantageous over other embodiments. All of the embodiments described herein are provided to enable persons skilled in the art to make or use the disclosed embodiments and not to limit the scope of the disclosure which is defined by the claims. Furthermore, there is no intention to be bound by any expressed or implied theory presented in the preceding technical field, background, brief summary, the following detailed description or for any particular computer system.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below as being "connected," similar elements may be "coupled," and vice versa. Thus, although the block diagrams shown herein depict example arrangements of elements, additional intervening elements, devices, features, or components may be present in an actual embodiment.

Finally, for the sake of brevity, conventional techniques and components related to computer systems and other functional aspects of a computer system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment.

Figure 2:
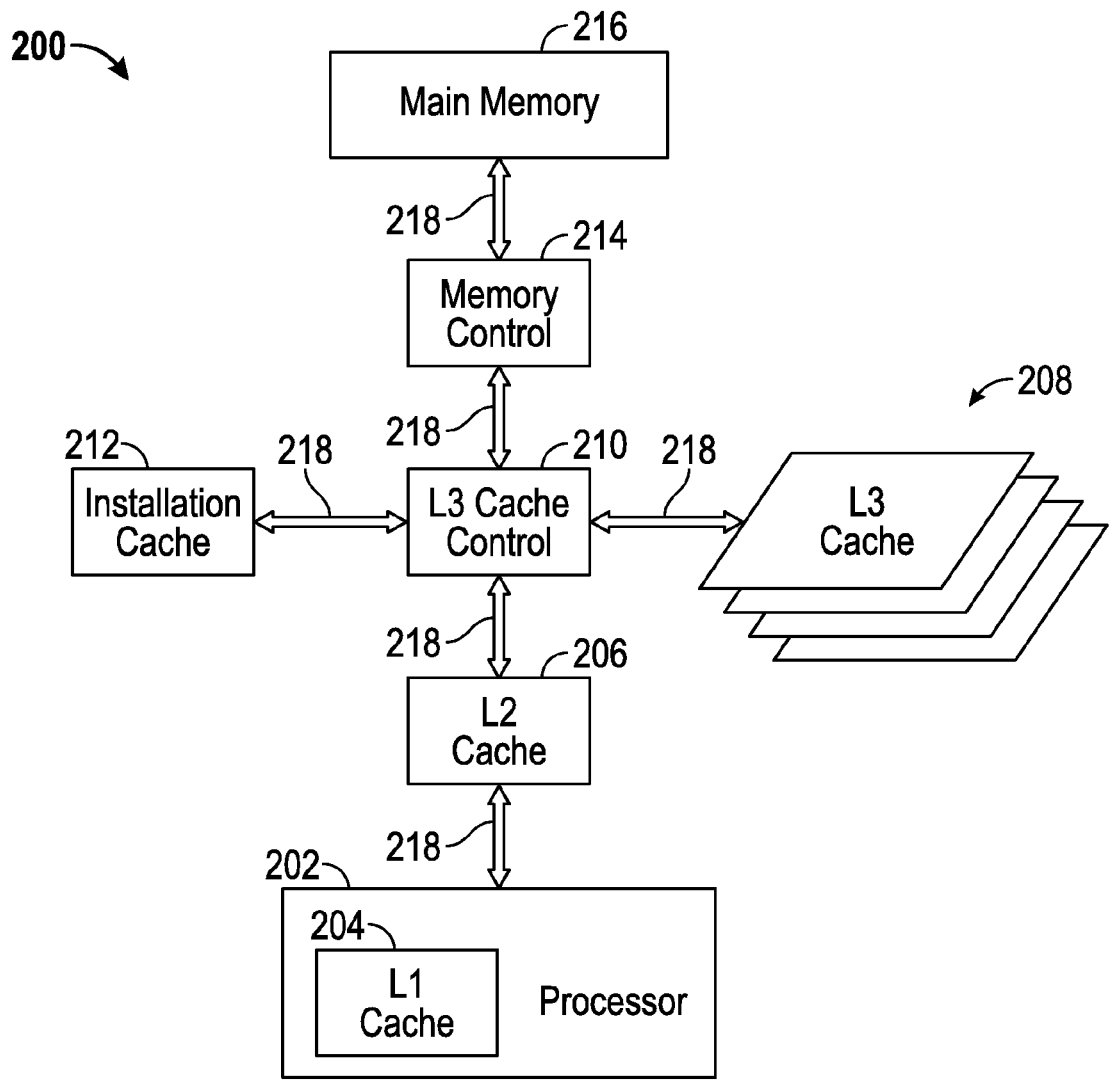
FIG. 2 is the block diagram of a processor and cache system according to embodiments.

Referring now to FIG. 2, a simplified block diagram is shown illustrating a system 200, which may be a desktop computer, laptop computer, server, set top box, digital television, printer, camera, motherboard, or any other device employing data processors. In the non-limiting embodiment illustrated in FIG. 2, the system 200 includes a processor 202, which may include an L1 cache 204, an L2 cache 206, an L3 cache, an L3 cache controller 210, an installation cache 212, a memory control 214 and a main memory 216 each connected via an interconnect 218.

The processor 202 may be any type of "processing unit" known in the art (e.g., a central processor unit (CPU), a heterogeneous processor unit, an accelerated processing unit (APU), graphics processing unit (GPU), a network processing unit, a security processing unit, a compression processing unit). As used herein, the term "processing unit" refers to hardware within a computer system, that is designed execute a sequence of stored instructions of a computer program that is stored in some kind of memory by performing the basic arithmetical, logical, and input/output operations of the system 200. The processor 202 may be, for example, a single or multi-core general-purpose microprocessor. A microprocessor is a multipurpose, programmable device that accepts digital data as input, processes it according to instructions stored in a memory, and provides results as output.

In some embodiments, the processor 202 may be an accelerated processing unit (APU). An accelerated processing unit (APU) refers to a processing system that includes additional processing capability designed to accelerate one or more types of computations outside of a CPU. This may include a graphics processing unit (GPU) used for general-purpose computing (GPGPU), reconfigurable processing unit, a field-programmable gate array (FPGA), or similar specialized processing system. An APU can also refer to a processing device which integrates a CPU and a GPU on the same die, thus improving data transfer rates between these components while reducing power consumption. APUs can also include video processing and other application-specific accelerators.

In some embodiments, another implementation, the processor 202 may be a graphics processing unit (GPU) also occasionally called visual processing unit (VPU). A GPU can refer to any specialized electronic circuit designed to rapidly manipulate and alter memory in such a way so as to accelerate the building of images in a frame buffer intended for output to a display. GPUs are often used in embedded systems, mobile phones, personal computers, workstations, and game consoles.

The L1 cache 204, the L2 cache 206, the L3 cache 208 and the installation cache 212 may be any type of memory including dynamic random access memory (DRAM), the various types of static RAM (SRAM), and the various types of non-volatile memory (e.g., PROM, EPROM, flash, phase change memory (PCM), resistive technologies such as memristors or spin-torque transfer magnetic RAM (STT-MRAM). Typically, the L1 cache is the smallest and fastest cache in the system 200, the L2 cache 206 is larger and slower than the L1 cache 204, and the L3 cache 208 is larger and slower than the L2 cache 206. Optionally, additional levels of caches may be employed in any given system 200, with each cache level being typically larger and slower than the previous one (but typically still faster than main memory 216). The last level cache in any sequence of caches is commonly referred to as the "last-level cache" (LLC), which in the embodiment illustrated in FIG. 2, would be the L3 cache.

In a non-limiting embodiment, the L3 cache 208 employs die-stacking technology (as illustrated in FIG. 2) and is implemented as row-based DRAM. As noted above, DRAM has a higher latency than some other memory technologies and using DRAM with row-based access may result in a slower cache response. Also, a cache miss may become more likely during peak usage since data is not considered cached until the data physically resides in the cache.

Accordingly, non-limiting embodiments include an installation cache 212. The installation cache may also be implemented using any of the memory technology examples mentioned above, but generally, has a memory technology selected to have a lower latency than the L3 cache 208. In a non-limiting example, the installation cache 212 may be realized using SRAM while the L3 cache 208 is implemented using die-stacked DRAM. When data is fetched from the main memory 216, the data is loaded by the L3 cache control 210 into both the L3 cache 208 and the installation cache 212 via the interconnect 218. In some embodiments, the data is loaded simultaneously into the L3 cache 208 and the installation cache 212. In some embodiments, the data may be loaded serially, generally first in the installation cache and then into the L3 cache 208. Due to the lower latency, data will become available to be returned from the installation cache 212 prior to being loaded into the L3 cache 208. After the data becomes available in the L3 cache 208, the data may be removed from the installation cache 212 or may be left in the installation cache or over-written as necessary to load new data into the installation cache 212. In this way, the advantages offered by die-stacked DRAM may be achieved with a lower risk of cache misses and reduced system performance due to higher latencies.

In some embodiments, data may be loaded, accessed and removed from the installation cache 212 prior to the data being loaded into the L3 cache 208 or before completion of the data being loaded in the L3 cache. For example, the L3 cache 208 may busy for an extended amount of time and the data isn't loaded until after the data has been loaded, accessed and removed from the installation cache 212. Moreover, such embodiments afford another benefit in that it allows the system 200 to defer loading the data into the L3 cache 208 until a future time when the L3 cache is less busy. In this way, loading the data into the L3 cache 208 may be less likely to interfere or conflict with other operations or cache accesses.

Physical placement of the installation cache 212 within the system 200 may vary according to the implementation of the L3 cache 208 or the main memory 216. As a non-limiting example, for a die-stacked DRAM over a multicore processor, the installation cache 212 may be placed on the same chip as the multicore processor's memory controller. In some embodiments, the main cache may contain a logic layer upon which the installation cache 212 may be placed. Regardless of how the installation cache 212 is implemented in any particular system, the installation cache 212 provides the advantage of low latency cache returns allowing the use of higher latency die-stacked DRAM L3 cache memory 208 with reduced risk of increasing cache misses.

Figure 1A:
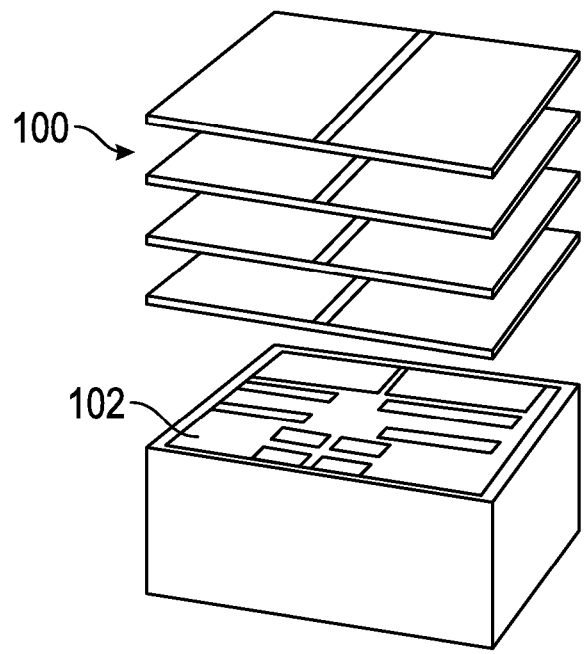
FIGS. 1A and 1B are illustrations of a conventional die-stacked memory and processor.
Figure 1B:
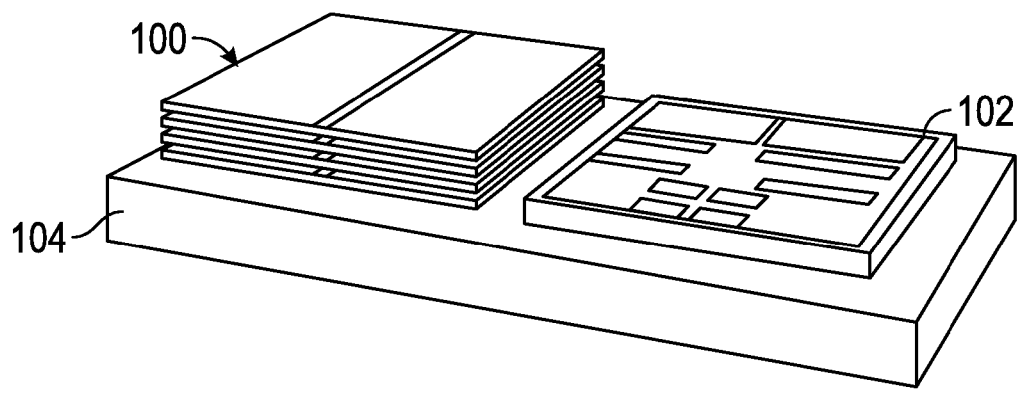
Figure 3:
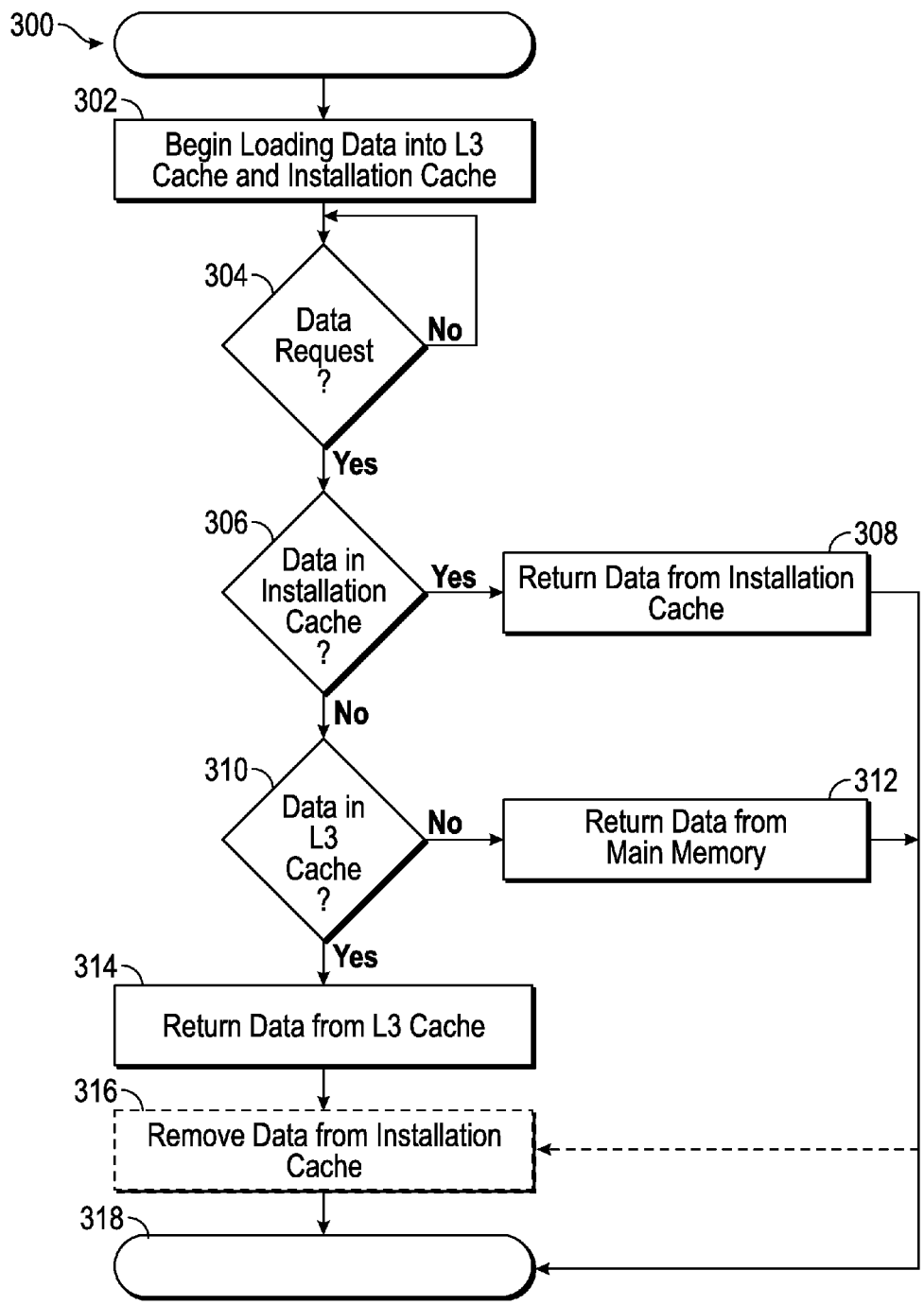
FIG. 3 is a flow diagram of a caching method according to embodiments.

FIG. 3 is a flow diagram useful for understanding the caching method 300 of the present disclosure. The various tasks performed in connection with the method of FIG. 3 may be performed by software, hardware, firmware, or any combination thereof. For illustrative purposes, the following description of the method of FIG. 3 may refer to elements mentioned above in connection with FIGS. 1-2. In practice, portions of the method of FIG. 3 may be performed by different elements of the described system (200 in FIG. 2). It should also be appreciated that the method of FIG. 3 may include any number of additional or alternative tasks and that the method of FIG. 3 may be incorporated into a more comprehensive procedure or process having additional functionality not described in detail herein. Moreover, one or more of the tasks shown in FIG. 3 could be omitted from embodiments of the method of FIG. 3 as long as the intended overall functionality remains intact.

Referring now to FIG. 3, a flow diagram is provided illustrating a caching method 300 according to embodiments. The method 300 begins in block 302 where data begins to be loaded into the installation cache (212 in FIG. 2) and the L3 cache (208 in FIG. 2). The data may be loaded simultaneously or serially (typically first in the installation cache) as desired in any particular implementation. Decision 304 determines whether a data request has been made. If not, data continues to be loaded into the installation cache and the L3 cache. If a request has been made, decision 306 determines whether the data resides in the installation cache. The data may not reside in the installation cache if it has not yet completed loading, was not fetched or has been removed or over-written by newer data. However, if the data is present in the installation cache, block 308 returns the data to the processor (202 in FIG. 2) as a cache hit. Optionally, the data may be removed from the installation cache after being returned in block 316.

If the data is not present in the installation cache, decision 310 determines whether the data resides in the L3 cache (206 in FIG. 2). A negative determination of decision 310 produces a cache miss causing the main memory (216 in FIG. 2) to be accessed to retrieve the data (block 312). Alternately, assuming the data was cached in the L3 cache, block 314 returns the data from the L3 cache to the processor (202 in FIG. 2) as a cache hit. Optionally, depending upon the memory management system utilized, block 316 may remove data from the installation cache (212 in FIG. 2). This may be realized by deleting (clearing) data installation cache, by over-writing data in the installation cache that has returned data or by over-writing the oldest data in the installation cache. The routine ends in block 318 after data is returned from the installation cache (block 308 with optional block 316), data is returned from main memory (block 312), or data is returned from the L3 cache (block 314 with optional block 316).

As noted above, one or more of the tasks shown in FIG. 3 could be omitted from embodiments of the method 300 of FIG. 3 as long as the intended overall functionality remains intact. For example, data may be loaded (block 302), accessed (block 308) and removed (block 316) from the installation cache 212 prior to the data being loaded into the L3 cache 208 or the completion of data being loaded into the L3 cache. For example, the L3 cache 208 may busy for an extended amount of time and the data isn't loaded into the L3 cache until after the data has been loaded, accessed and removed from the installation cache 212. This method variation allows the system 200 to defer loading the data into the L3 cache 208 until a future time when the L3 cache is less busy. In this way, loading the data into the L3 cache 208 may be less likely to interfere or conflict with other operations or cache accesses.

A data structure representative of the system 200 and/or portions thereof included on a computer readable storage medium may be a database or other data structure which can be read by a program and used, directly or indirectly, to fabricate the hardware comprising the system 200. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the system 200. The netlist may then be placed and routed to produce a data set describing geometric shapes to be applied to masks. The masks may then be used in various semiconductor fabrication steps to produce a semiconductor circuit or circuits corresponding to the system 200. Alternatively, the database on the computer readable storage medium may be the netlist (with or without the synthesis library) or the data set, as desired, or Graphic Data System (GDS) II data.

The method illustrated in FIG. 3 may be governed by instructions that are stored in a non-transitory computer readable storage medium and that are executed by at least one processor of the system 200. Each of the operations shown in FIG. 3 may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

While embodiments have been presented in the foregoing detailed description, it should be appreciated that a vast number of variations exist. It should also be appreciated that the embodiments are only examples, and are not intended to limit the scope, applicability, or configuration in any way. Rather, the foregoing detailed description will provide those skilled in the art with a convenient road map for implementing the embodiments, it being understood that various changes may be made in the function and arrangement of elements described in the embodiments without departing from the scope as set forth in the appended claims and their legal equivalents.

What is claimed is:

1. A method for operating a computing system that comprises a plurality of caches, the caches arranged in a hierarchy of levels, comprising:
    loading data into an installation cache and a cache, wherein the installation cache and the cache are both located on a same level in the hierarchy of levels; and
    responsive to a request for the data, returning data from the installation cache when the data has not been completely loaded into the cache.

2. The method of claim 1, further comprising responsive to the request for data, returning data from the cache when the data has been completely loaded into the cache.

3. The method of claim 1, wherein loading the data into the installation cache comprises loading the data into a Static Random Access Memory (SRAM) having a lower latency than the cache.

4. The method of claim 1, wherein loading the data into the cache comprises loading the data into a Dynamic Random Access Memory (DRAM) having a higher latency than the installation cache.

5. The method of claim 1, further comprising removing the data from the installation cache after the data has been completely loaded into the cache.

6. The method of claim 1, further comprising allowing the data to be over-written in the installation cache after the data has been completely loaded into the cache 7. The method of claim 1, further comprising removing an oldest data row from the installation cache after the installation cache is full and a new data row is ready for loading.

8. The method of claim 1, further comprising retrieving the data from main memory when the data is not loaded into the installation cache or the cache.

9. A system, comprising:
a processor;
a memory coupled to the processor;
a cache coupled to the processor and the memory;
an installation cache coupled to the processor and the memory; and
one or more other caches coupled to the processor and the memory, wherein the cache, the installation cache, and the one or more other caches are arranged in a hierarchy of levels with the installation cache and the cache both located on a same level in the hierarchy of levels and the one or more other caches located on corresponding different levels in the hierarchy of levels;
wherein, the system is configured to:
load data from the memory into the installation cache and the cache;
responsive to a request for the data, return data from the installation cache to the processor when the data has not completely loaded into the cache.

10. The method of claim 9, further comprising responsive to the request for the data, returning data from the cache when the data has been completely loaded into the cache.

11. The system of claim 9, wherein the installation cache comprises a Static Random Access Memory (SRAM) having a lower latency than the cache.

12. The system of claim 9, wherein the cache comprises a row-based memory.

13. The system of claim 12, wherein the cache comprises a die-stacked Dynamic Random Access Memory (DRAM) having a higher latency than the installation cache.

14. The system of claim 9, wherein the system is further configured to remove the data from the installation cache after the data has been completely loaded into the cache.

15. The system of claim 9, wherein the system is further configured to allow the data to be over-written in the installation cache after the data has been completely loaded into the cache.

16. The system of claim 9, wherein the system is further configured to remove an oldest data row from the installation cache after the installation cache is full and a new data row is ready for loading.

17. The system of claim 9, wherein the system is further configured to return data from the memory when the data is not loaded into the installation cache or the cache.

18. A method, comprising:
loading data into a Static Random Access Memory (SRAM) installation cache and a Dynamic Random Access Memory (DRAM) cache having a higher latency than the SRAM installation cache, the installation cache and the cache both located on a same level in a hierarchy of cache levels, wherein one or more other caches are located on corresponding different levels in the hierarchy of cache levels;
responsive to a request for the data, returning data from the SRAM installation cache to a processor when the data has not completely loaded into the DRAM cache; and
responsive to the request for the data, returning data from the DRAM cache to the processor after the data has been completely loaded into the DRAM cache.

19. The method of claim 18, further comprising responsive to the request for the data, removing the data from the SRAM installation cache after the data has been completely loaded into the DRAM cache.

20. The method of claim 18, further comprising responsive to the request for the data, retrieving the data from a main memory when the data is not loaded into the installation cache or the cache.

* * * * *